Figure 1:
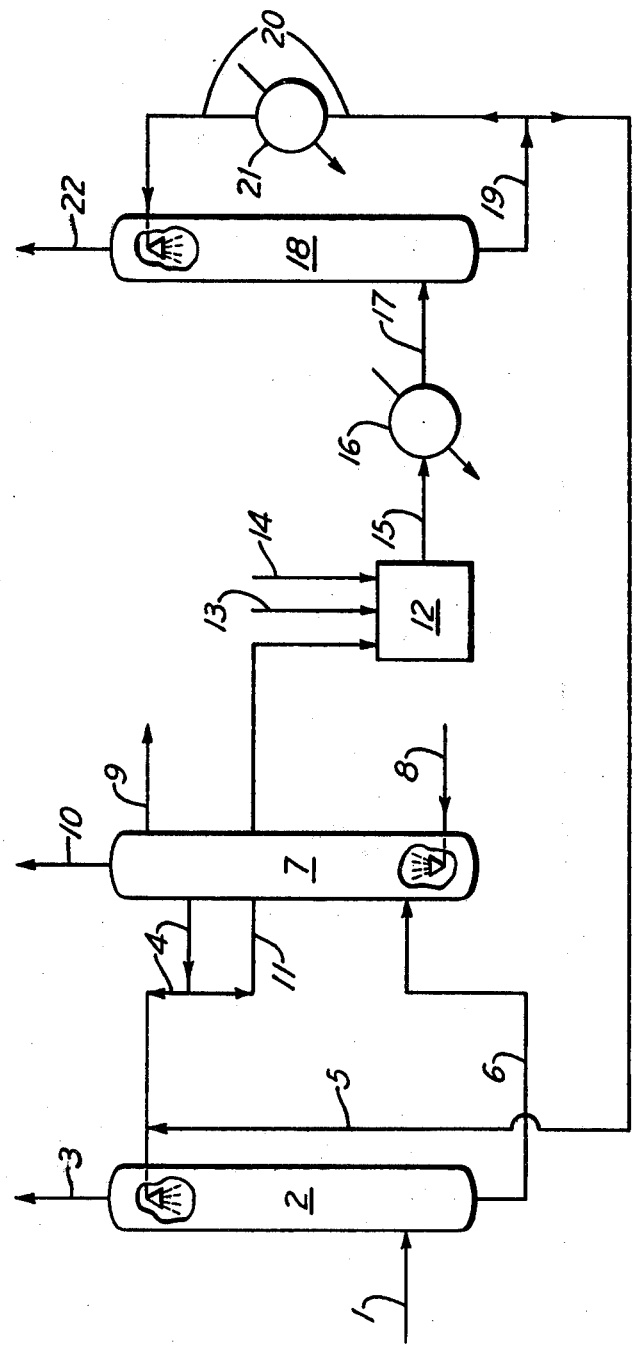

United States Patent [19]

Haese

[11] 4,013,779
[45] Mar. 22, 1977

[54] PROCESS FOR REMOVAL OF AMMONIA, HYDROGEN SULFIDE AND HYDROGEN CYANIDE FROM GASES CONTAINING THESE SUBSTANCES

[75] Inventor: Egon Haese, Bochum, Germany

[73] Assignee: Dr. C. Otto & Comp. G.m.b.H., Bochum, Germany

[22] Filed: Jan. 2, 1974

[21] Appl. No.: 430,233

[30] Foreign Application Priority Data

Dec. 30, 1972 Germany .................... 2264264

[52] U.S. Cl. .................... 423/573 R; 423/222; 423/236; 423/238
[51] Int. Cl.² .................... C01B 17/04; B01D 53/34
[58] Field of Search .......... 423/220, 222, 234, 236, 423/238, 351, 366, 232, 573

[56] References Cited

UNITED STATES PATENTS

| | | | |
|---|---|---|---|
| 961,763 | 6/1910 | Falding | 423/238 X |
| 1,160,836 | 11/1915 | Burkheiser | 423/236 X |
| 2,988,430 | 6/1961 | Horner | 423/648 |
| 3,887,682 | 6/1975 | Kumata et al. | 423/232 |

FOREIGN PATENTS OR APPLICATIONS

| | | | |
|---|---|---|---|
| 17,302 | 1/1930 | Australia | 423/351 |
| 1,064,507 | 4/1967 | United Kingdom | 423/220 |

*Primary Examiner*—Earl C. Thomas
*Attorney, Agent, or Firm*—Brown, Murray, Flick & Peckham

[57] ABSTRACT

In the process disclosed, gas from a coke plant is washed with an aqueous metallic salt solution including sulfureous and sulfuric acid to absorb the ammonia, hydrogen sulfide and hydrogen cyanide from the gas. The washing solution is then oxidized in an aerating tank to recover elementary sulfur. A portion of the washing fluid from the oxidizer is returned for continued washing of gas and a portion of the fluid is heated in the presence of a catalyst to yield products of combustion including an acid anhydride and a metal or metal oxide. After processing the combustion products through a heat recovering system, the acid anhydride and metal oxides are combined and react to form renewed aqueous metal salt solution that is combined with the oxidized washing solution to wash additional quantities of gas.

11 Claims, 3 Drawing Figures

PROCESS FOR REMOVAL OF AMMONIA, HYDROGEN SULFIDE AND HYDROGEN CYANIDE FROM GASES CONTAINING THESE SUBSTANCES

BACKGROUND OF THE INVENTION

This invention relates to a process for the removal of ammonia, hydrogen sulfide and hydrogen cyanide from gases containing these substances. More particularly, the present invention relates to the process for removing said substances from coke plant gases by washing the gas with metallic salts.

Processes are known in the art involving the use of an aqueous alkali solution in the form of iron sulfate as a gas absorption agent. In this process, ammonia from the gas is converted into ammonium sulfate $(NH_4)_2SO_4$, the majority of the hydrogen sulfide removed from the gas is converted into iron sulfide, FeS, and the hydrogen cyanide removed from the gas is converted into iron cyanide compounds. Most of these known processes provide for the drawing off of a portion of the absorption agent and treating it with oxygen or gases containing oxygen in an oxidizer. During the course of this treatment, elementary sulfur is obtained from the iron sulfide and drawn off in the form of flowers or sulfur. This process yields iron hydroxide which is then returned for further washing of gases.

In all of these known processes, they have features that are common, namely, they require the constant addition of iron sulfate for the formation of ammonium sulfate and the formation of the iron cyanide compounds; and secondly, the ammonium sulfate and the iron compounds that have resulted from the process must be withdrawn from the circulating system. It follows, therefore, that these known processes are severely limited since even if caustic alkali can be purchased at favorable terms, it is no longer economically feasible to produce crystalline ammonium sulfate since the requirements for products containing ammonia can be supplied more economically by other processes. Moreover, the present ecological conditions necessitate a total elimination to discharging cyanide compound which is poisonous.

A more comprehensive disclosure and discussion of known processes for the treating of coke oven gases is given in Vol. 2 of "Chemistry of Coal Utilization" by National Research Council Committee published by John Wiley & Sons, 1945.

SUMMARY OF THE INVENTION

It is an object of the present invention to provide a process for treating gases in a manner that facilitates the elimination of ammonia compounds and cyanide compounds that occur in connection with the washing of the gas.

It is a further object of the present invention to provide a process that will facilitate the regeneration of washing solutions for gases in a system to recycle the solution in a manner to avoid the need to continually add chemicals for renewing or maintaining the washing solution.

In accordance with the present invention, there is provided a process to remove ammonia, hydrogen sulfide and hydrogen cyanide forming part of a gas from coke plants and the like, the process including the steps of washing the gas with an aqueous metallic salt solution including sulfuric acid to absorb gaseous ammonia, hydrogen sulfide and hydrogen cyanide; oxidizing the metallic salt solution bearing the absorbed gases to recover elementary sulfur; heating a portion of the oxidized metallic salt solution to produce products of combustion including nitrogen, water vapor, acid anhydride and a metal or metal oxide; cooling the acid anhydride in the presence of the metal or metal oxide to chemically react and produce an aqueous metallic salt solution; and using the produced aqueous metallic salt solution together with a portion of the oxidized metallic salt solution to wash further quantities of gas containing gaseous ammonia, hydrogen sulfide and hydrogen cyanide.

More particularly, according to the present invention, there is provided a process for treating a gas with an aqueous solution of metallic salts of sulfureous acid with the possible further addition of salts of sulfuric acid which are carried in the circulating system by way of an oxidizer. A portion of the aqueous solution discharged from the oxidizer is withdrawn and subjected to a combustion process after a heating medium has been added to it. The combustion products that are formed contain nitrogen, water vapor, an acid anhydride as well as metal or metal oxides. These combustion products are then cooled and the metal or metal oxides are caused to react with the acid anhydride using the water vapor in order to produce a fresh supply of aqueous metallic salt solution to continue washing the gas. In the process, it is preferred that in the washing cycle, the ammonia salt content in the metallic salt solution is maintained at a point near the crystallization point and that it is possible to increase the ammonia content by way of vaporization in the partial stream of oxidized washing solution. The aqueous metallic salt solution may further include, as a catalyst, nickel in quantities, such that the nickel content of the entire salt solution is at least 2.1% and preferably within the range of 4% to 10%. In the aforementioned process, the cooling and condensation of the combustion products is facilitated by circulating a cooled solution. The metallic oxide dust particles are produced by controlling the combustion process so that they have a median grain size of 6–8 microns and suspended in fluid. This suspension is used to wash the acid anhydride, thus causing a chemical reaction to form the appropriate salts, for example, iron sulfite, $FeSO_3$ and iron sulfate $FeSO_4$ whereupon these salts are returned to the gas washing cycle.

The metallic salt solution employed for washing the gas may be produced from a solution of iron salts, manganic salts, magnesium salts or mixtures containing such salts. In the process, when the fluid withdrawn from the oxidizer to undergo combustion when the combustion process takes place at temperatures of 900°–1100° C, then the combustion causes a transformation of the bounded ammonia and the bounded hydrogen cyanide producing water vapor, carbonic acid and nitrogen which are harmless substances and may be discharged into the atmosphere without polluting the environment. Moreover, in the process, useful elementary sulfur is drawn off from at the top of the structure used for oxidizing the gaseous laden washing solution.

In accordance with another aspect of the process of the present invention, the procedure to form combustion products from a portion of the oxidized washing solution is carried out in such a manner such that there is produced metal oxide in granular or powder form having a particle size within the range of 5–200 microns, preferably within 5–20 microns. This aspect of the present invention further includes the separation of metal powders, i.e., metal oxide from the gas phase of the combustion products prior to condensation thereof. For this purpose, the tower used to facilitate condensation of the combustion products is constructed with several levels wherein the powder-free combustion waste gases are fed into the lowest level and the metal oxide powders are fed into the uppermost level of the tower.

Figure 3:
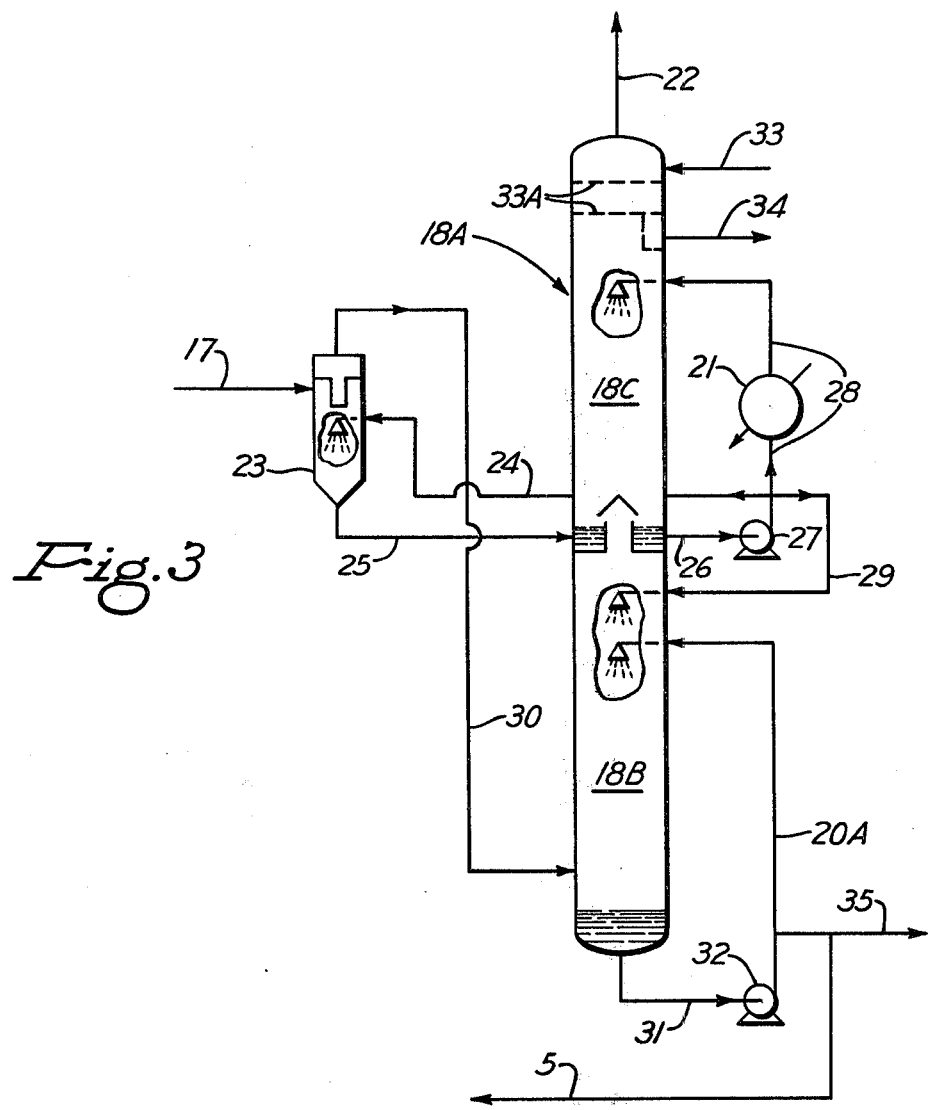
Figure 2:
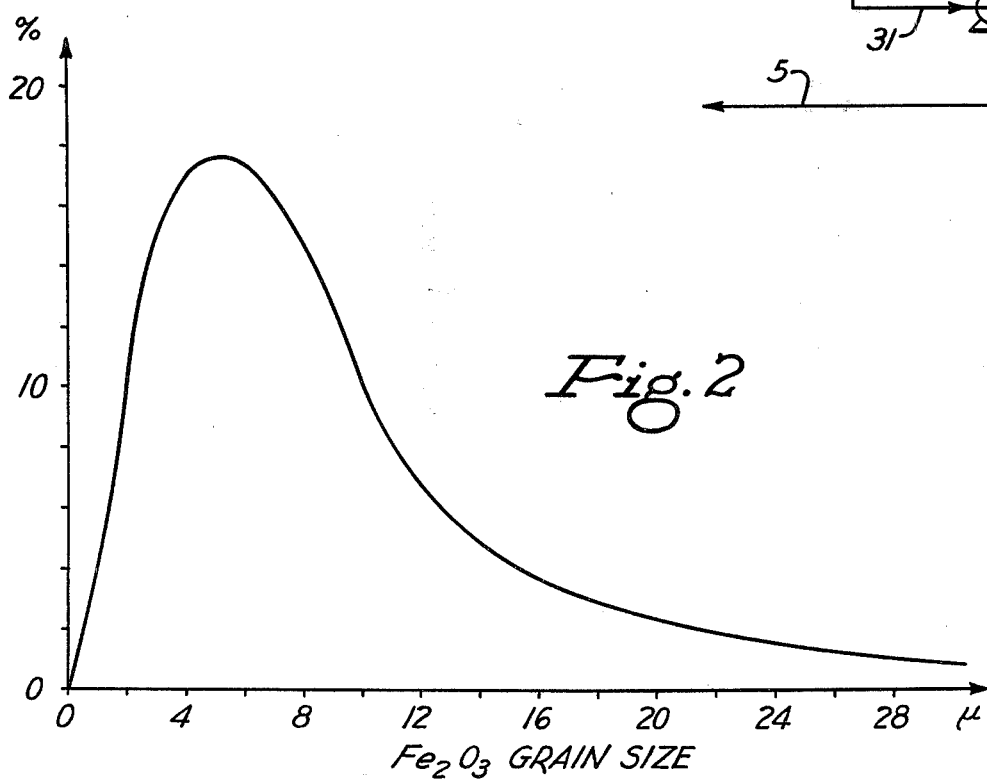

These features and advantages of the present invention as well as others will be more readily understood when the following description is read in light of the accompanying drawings, in which:

FIG. 1 is a schematic illustration of apparatus to carry out the process of the present invention;

FIG. 2 is a graph representing the granular distribution spectrum of $Fe_2O_3$ formed as a combustion product from the combustion of a portion of the oxidized metallic salt solution; and FIG. 3 is a schematic illustration of a modified form of condensation tower to that illustrated in FIG. 1 for providing a modified form of process wherein metal powders as combustion products are separated for further treatment in the bilevel form of condensation tower.

In FIG. 1, the gas from a coke plant is conducted by line 1 to a washing tower 2 from where the gas, after washing, is exhausted through line 3. Washing fluid enters into the tower by way of line 4 which is joined with line 5 for the addition of regenerated washing fluid, to be described hereinafter. In the washing tower, the ammonia, hydrogen sulfide and hydrogen cyanide gases contained in the coke plant gas are transformed into ammonia salts, sulfides and cyanogen compounds. The washing solution containing the absorbed gas is delivered by a drain line 6 from the washing tower to the lower end of an oxidizing tower 7. Line 8 is used to inject air into the oxidizing tower causing the sulfur compounds formed from the hydrogen sulfide to oxidize and precipitate elementary sulfur. In the oxidation tower bivalent iron hydroxide is transformed into trivalent iron hydroxide with the latter subsequently playing an important role in the absorption of hydrogen sulfide, $H_2S$. Line 9 is used to draw off the elementary sulfur in the form of flowers of sulfur at the upper end of the oxidation tower where it accumulates due to floating by the rising air. The sulfur conducted by line 9 is subjected to further treatment. Line 10 conducts waste air from the oxidizing tower. The oxidized solution is withdrawn from the washing tower by line 4 and a portion of it is returned for further use in the washing cycle. A portion of the washing solution conducted by line 4 is drawn off by line 11 and delivered to a combustion apparatus 12 wherein it undergoes a combustion process at 900° to 1100° C by using a heating agent added by way of line 13 and added combustion air via line 14.

The apparatus for the combustion process is a type of apparatus well known in the art and includes, for example, the types of apparatus used in the regeneration of secondary acids from caustic metals. One type of proven suitable apparatus was a pear-shaped reactor with an attached combustion chamber. In the combustion chamber, combustion gas is produced at a temperature of about 1200° to 1400° C. This flue gas contains the required amount of free oxygen necessary for the reaction with the salts of the washing solution. The flue gases enter into the lower portion of the reactor after they have passed through a twist producing type (cyclone) nozzle, not shown. The oxidized washing solution to be treated by the combustion apparatus 12 is fed by a nozzle into its upper portion which is tapered and has a pear-like shape. The rotary spinning motion of the flue gas coupled with the reactor's shape results in currents within the apparatus that facilitate a high degree of reconversion effect. This causes small particles of material within the reactor to react rapidly.

Another form of apparatus for the combustion process takes the form of a loop-reactor. This apparatus is made up of a cylindrical container into which a center pipe is installed in such a manner such that a portion of the gases flow back into the circular space in the container. These gases are withdrawn by the central pipe together with flue gas from the combustion chamber. The flue is introduced through a nozzle at a high velocity. The material that is to be treated is injected parallel to the flue gas at the level of the flue gas nozzle.

It has been discovered that if nickel salts are present, a distinct catalytic effect is achieved in the combustion apparatus 12. The output capacity is considerably increased without any decrease in the transformation of ammonia and hydrogen cyanide. The combustion process has been carried in the manner of slightly reducing the combustion so that a portion of the nickel was present in metallic form. When the same test was undertaken with an acid of other metallic salt solutions to which nickel salts were added, the nickel portion produced a catalytic effect when the same method of operation was employed. It was, therefore, determined that the nickel content should exist at a minimum of 2.1% by weight, preferably within the range 4%–10% by weight relative to the total metal content of the materials within the combustion reactor.

The waste gases from the combustion apparatus contain water vapor, nitrogen, carbonic acid, the acid anhydride and finely-divided metal oxide. These are conducted by line 15 to a heat recovery system 16 and thence by line 17 to a condensation tower 18. Cooling in the condensation tower is facilitated by using lines 19 and 20 to circulate liquid through a cooler 21. This causes a condensation of a portion of the water vapor contained in the waste gas and a precipitation of the metallic oxide therein. The suspension thus formed reacts with the acid anhydride to reform the aqueous metallic salt originally used in the washing cycle. Thus, iron sulfite, $FeSO_3$, and iron sulfate, $FeSO_4$, is again formed from the iron oxide, $Fe_2O_3$, and the sulfur dioxide, $SO_2$. The reaction product obtained from the condensation tower is again fed into the washing cycle as a fresh aqueous metallic salt solution via line 5. Line 22 conducts waste gases from the condensation tower to the outside.

It is technically feasible to execute the process of the present invention with a circulating solution that contains approximately 1–4 grams per liter of iron. However, a particular advantage of the process is based on the fact that other sulfates of salts and salts of sulfur may be employed successfully inasmuch as there is practically no consumption and the cost of the onetime charge is economically meaningless. Magnesium and manganese may be used to form such other sulfates of salt and salts of sulfur. A prerequisite for the successful execution of the process of the present invention is a sufficiently high degree of alkalinity of the circulating solution. This is, however, in most instances, governed by a high $NH_3$ content of the coke gas which is being treated. Favorable washing conditions and optimum material transformation for the absorption of gases are obtained by maintaining pH values between 7.5 and 9.

Depending upon the temperature and the pH value, small amounts of by-products such as thiosulfate and thiocyanate are formed in the washing cycle due to secondary reactions from ammonia and hydrogen sulfide. These by-products reach the combustion apparatus by way of washing solution that is removed from the oxidizing apparatus. The combustion product may, as a result, contain a very slight excess of sulfureous acid which may not be reintroduced. In accordance with the present invention, this excess acid is withdrawn at the top of the condensation tower, or it is removed in the form of iron sulfate. The processes for doing this will be described in greater detail hereinafter.

Tests of the process according to the present invention have indicated that a dwell period is needed for transformation in the condensation tower which is dependent not only upon the temperature but also the grain size of the metallic oxide resulting from the combustion process. The material to be treated in the combustion apparatus must, therefore, be prepared in such a manner that the grain size of the withdrawn metallic oxide is within the range 5 and 200 microns, preferably within the range of 2 and 20 microns. FIG. 2 shows a typical grain distribution spectrum of $Fe_2O_3$ obtained from a solution injected into the combustion apparatus by means of a binary nozzle. The median grain size was about 8 microns.

It has been shown of practical importance that if prior to feeding the combustion products into the condensation tower, the metallic oxide powders are fed into a two-level condensation tower in a separate manner. One form of apparatus to carry out this process is illustrated in FIG. 3. Line 17, which conducts gases from the combustion apparatus via the heat recovering system of FIG. 1, delivers the gas together with metallic powders contained in it to a separator 23. In this separator, the gases are rinsed with liquid withdrawn from an upper second level 18C of a condensation tower 18A. This liquid is introduced by line 24 and it carries the powder from the separator 23 by line 25 into a sump or pit at the bottom of the second level 18C in the condensation tower. At this level in the tower, heat for condensation process is removed by withdrawing liquid from the sump in line 28 using a pump 27 that, in turn, delivers the liquid in lines 28 through the cooler 21 and returns it to the upper portion of the second level of the tower. The temperature in this section is adjusted so as to equalize the water balance in the entire system in the tower. The solution and the metal oxide suspension therein obtained by way of condensation process in level 18C have already partially reacted with the acid anhydride which is also contained in second level. These materials are transferred to the first level 18B by line 29. Into this level, the gas phase from the separator 23 is delivered by line 30. Line 31 connected to pump 32 delivers the liquid through line 20A for the circulation of the liquid to facilitate contact between the gas phase and the circulated solution. Regenerated washing solution is removed from this system by line 5. Small excessive amounts of sulfur dioxide caused by secondary reaction of the hydrogen sulfide in the washer cycle which appear in the products from combustion apparatus as sulfur dioxide, may be eliminated in two ways according to the present invention. The first possibility for the removal of this sulfur dioxide occurs when the processes in the condensation tower 18A are carried out without producing an excess of iron. Therefore, an excess acid anhydride occurs in the gas phase at the upper level 18C of the condensation tower. The process of the present invention provides that this acid anhydride is reacted with an alkaline solution such as ammoniated water or lime milk solution. The use of lime milk solution is especially useful in conjunction with coke plants inasmuch as the entire amount of lime milk required for the removal of fixed ammonia salts from the gas condensate may simply be carried out by way of the condensation tower.

The second possibility for removing a slightly excess amount of sulfur dioxide occurs when the processes of the condensation tower are carried out with an excess of iron present and then additional salt sulfates or salts of sulfur also come into existence. These can be removed and expelled from the system. When the salts are oxidized into trivalent iron sulfate, then the product thus obtained constitutes a chemical much in demand for biological preparation of coke plant waste water.

In FIG. 3, the aforementioned two possibilities for the removal of a slightly excess amount of sulfur dioxide are carried out by providing line 33 for adding an alkaline solution to the upper level 18C of the condensation tower. The solution flows downwardly from two washing plates 33A and from the bottom plate, the solution is delivered by line 34 to an ammonia recovering device for the gas condensate carried in the liquid. FIG. 3 also illustrates a line 35 connected in line 20A whereby a portion of the liquid is removed for additional oxidation of the iron sulfate content in the liquid.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A process for removing gaseous ammonia, hydrogen sulfide and hydrogen cyanide forming part of gas from coke plants and the like, said process including the steps of:

washing said gas with an aqueous metallic salt solution of a salt selected from the group consisting of iron salts, manganic salts and magnesium salts and formed by an acid selected from the group consisting of sulfuric acid and sulfureous acid to absorb gaseous ammonia, hydrogen sulfide and hydrogen cyanide;

oxidizing the metallic salt solution bearing the absorbed gases to form and precipitate elemental sulfur;

recovering the elemental sulfur from the solution;

returning a first portion of the resulting oxidized solution to the gas washing step;

heating the remaining portion of the resulting oxidized metallic salt solution to a temperature of at least 900° C to produce products of combustion including nitrogen, water vapor, the acid anhydride of said acid and metallic oxide of the metal of said salt;

cooling said acid anhydride of said acid in the presence of said metallic oxide of the metal of said salt together with sufficient quantities of water to produce said aqueous metallic salt solution; and using the produced aqueous metallic salt solution together with said first portion of said oxidized metallic salt solution to wash further quantities of said gaseous ammonia, hydrogen sulfide and hydrogen cyanide from the gas.

2. The process of claim 1 including the further step of providing a catalyst of at least 2.1% nickel by weight of the total metal content of the oxidized metallic salt solution during, said heating thereof.

3. The process of claim 2 wherein the catalytic nickel content is within the range of 4% to 10% of the total metal content of said portion of the oxidized metal salt solution during said heating thereof.

4. The process according to claim 1 wherein said heating a portion of the oxidized metallic salt solution is further defined to include heating the oxidized metallic salt solution to a temperature within the range of 900° to 1100° C to form as a combustion product granular metal oxide having a grain size lying in the range between 5 to 200 microns.

5. The process according to claim 4 wherein the granular metallic oxide has a grain size within the range of 5 microns and 20 microns.

6. The process according to claim 1 wherein the combustion products formed by said heating of a portion of the oxidized metallic salt solution pass through a heat recovery system prior to said cooling said acid anhydride in the presence of said metal oxide.

7. The process according to claim 1 including the step of separating metal oxide powder of said salt occurring as combustion products from said heating a portion of oxidized metal salt solution from the gas phase of the remaining combustion products prior to said cooling said acid anhydride in the presence of said metal oxide.

8. The process according to claim 1 wherein said cooling said acid anhydride together in the presence of said metal oxide includes the steps of introducing metal powder of the metal of said salt into an upper level of a bilevel condensation tower, and separately introducing gas formed as said products of combustion and essentially free of said metal powder into the lower level of said condensation tower.

9. The process according to claim 8 wherein said cooling said acid anhydride includes the further step of introducing an alkaline solution into said upper level of the condensation tower for washing a hydrogen sulfide content therefrom.

10. The process according to claim 9 wherein said alkaline solution is further defined as lime milk to remove ammonia from gases in said upper level of the condensation tower.

11. The process according to claim 8 wherein said cooling said acid anhydride includes the steps of: maintaining an excess of the metal of said salt in said condensation tower to transform hydrogen sulfide resulting from said washing said gas into a salt of sulfur, and extracting said salt of sulfur from liquid from said condensation tower.

* * * * *